US009088838B2

(12) United States Patent
Vall-Ilosera et al.

(10) Patent No.: US 9,088,838 B2
(45) Date of Patent: Jul. 21, 2015

(54) OTM FUNCTIONALITY IN SOA BASED TRANSCEIVERS (75) Inventors: Gemma Vall-Ilosera, Järfälla (SE); Luca Giorgi, Pisa (IT); Patryk Urban, Vällingby (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/131,455

(22) PCT Filed: Jul. 18, 2011

(86) PCT No.: PCT/SE2011/050952
§ 371 (c)(1),
(2), (4) Date: Jan. 8, 2014

(87) PCT Pub. No.: WO2013/012361
PCT Pub. Date: Jan. 24, 2013

(65) Prior Publication Data
US 2014/0147115 A1 May 29, 2014

(51) Int. Cl.
*H04J 14/00* (2006.01)
*H04Q 11/00* (2006.01)
*H04L 12/26* (2006.01)

(52) U.S. Cl.
CPC ........ *H04Q 11/0067* (2013.01); *H04L 43/0817* (2013.01); *H04Q 2011/0079* (2013.01)

(58) Field of Classification Search
CPC .................. H04Q 11/0067; H04Q 2011/0079; H04L 43/0817; H04B 10/271; H04B 10/272; H04B 10/278; H04J 14/0227; H04J 14/023; H04J 14/0231; H04J 14/0232; H04J 14/0234; H04J 14/0235; H04J 14/0239; H04J 14/0238; H04J 14/0241; H04J 14/0242; H04J 14/0243; H04J 14/0245; H04J 14/0246; H04J 14/047; H04J 14/0249; H04J 14/025; H04J 14/0252; H04J 14/0272; H04J 14/0279; H04J 14/028; H04J 14/0282
USPC .............................. 398/71, 72, 70, 67, 66, 38
See application file for complete search history.

(56) References Cited

U.S. PATENT DOCUMENTS 7,565,084 B1   7/2009   Wach
8,121,476 B2 * 2/2012   Park et al. ........................ 398/17
(Continued)

FOREIGN PATENT DOCUMENTS

CA    2613060 A1    6/2008
KR    100809400 B1  3/2008
(Continued)

OTHER PUBLICATIONS

International Telecommunication Union, "Gigabit-capable Passive Optical Networks (G-PON): Physical Media Dependent (PMD) layer specification", ITU-T G.984.2, Amendment 2, Mar. 1, 2008, pp. 1-16, Series G: Transmission Systems and Media, Digital Systems and Networks, Digital sections and digital line system—Optical line systems for local and access networks.
(Continued)

*Primary Examiner* — M. R. Sedighian
(74) *Attorney, Agent, or Firm* — Coats & Bennett, PLLC (57) ABSTRACT

A method and arrangement in an Optical Network Terminal, ONT for monitoring the state of an Optical Distribution Network, ODN, in a Passive Optical Network, PON, is provided. The ONT receives an optical signal, from an Optical Line Terminal, OLT, having optical power, $P_{o,sat}$, causing a Semiconductor Optical Amplifier, SOA, comprised in the ONU, to reach a saturated state. One or more parameters are measured. The parameters relates to the power provided from a power source to the SOA during a predefined time period, where the SOA is in a saturated state during the predefined time period. Information relating to the measured parameters are provided to the OLT and thereby enabling the OLT to compare the current state of the ODN to a previously measured reference state of the ODN.

16 Claims, 7 Drawing Sheets

(56) References Cited

U.S. PATENT DOCUMENTS

| | | | |
|---|---|---|---|
| 2006/0222364 | A1 | 10/2006 | Chung et al. |
| 2009/0067832 | A1 | 3/2009 | DeLew et al. |
| 2009/0220230 | A1 | 9/2009 | Kim et al. |
| 2010/0150574 | A1* | 6/2010 | Lee et al. .................. 398/157 |
| 2011/0038632 | A1* | 2/2011 | Zou .............................. 398/72 |
| 2011/0236021 | A1* | 9/2011 | Presi et al. ................... 398/67 |

FOREIGN PATENT DOCUMENTS

| | | |
|---|---|---|
| WO | 2009105742 A1 | 8/2009 |
| WO | 2012087205 A1 | 6/2012 |
| WO | 2012128677 A1 | 9/2012 |

OTHER PUBLICATIONS

Prat, J., et al., "Optical Network Unit Based on a Bidirectional Reflective Semiconductor Optical Amplifier for Fiber-to-the-Home Networks", IEEE Photonics Technology Letters, Jan. 1, 2005, pp. 250-252, vol. 17, Issue: 1, IEEE Photonics Society.

Presi, M., et al., "A 80 km reach fully passive WDM-PON based on reflective ONUs", Optics Express, Nov. 10, 2008, pp. 19043-19048, vol. 16, No. 23, Optical Society of America.

Rampone, T., et al., "Semiconductor Optical Amplifier Used as an In-Line Detector with the Signal DC-Component Conservation", Journal of Lightwave Technology, Jul. 1, 1998, pp. 1295-1301, vol. 16, No. 7, IEEE.

International Telecommunication Union, "10-Gigabit-capable passive optical network (XG-PON) systems: Definitions, Abbreviations, and Acronyms", ITU-T G.987, Jan. 1, 2010, pp. 1-17, Series G: Transmission Systems and Media, Digital Systems and Networks, Digital sections and digital line system—Optical line systems for local and access networks.

Telecommunication Standardization Sector of ITU, "10-Gigabit-capable passive optical network (XG-PON) systems: Definitions, abbreviations and acronyms", Series G: Transmission Systems and Media Digital Systems and Networks, Digital sections and digital line system—Optical line systems for local and access networks, Jun. 1, 2012, pp. 1-26, G.987, ITU.

International Telecommunication Union, Telecommunication Standardization Sector, "Proposed Basic Evaluation Method for Environmental Impact of Network Infrastructure regarding Deliverable 3—Methodology", Focus Group on ICT&CC, FG ICT&CC-C-43, Nov. 25, 2008, pp. 1-9, Geneva.

Urban, P. et al., "OTM- and OTDR-based cost-efficient Fiber Fault Identification and Localization in Passive Optical Network", Optical Fiber Communication Conference and Exposition (OFC/NFOEC), 2011 and the National Fiber Optic Engineers Conference, Mar. 6, 2011, pp. 1-3, IEEE, Los Angeles, CA.

Rampone, T. et al., Semiconductor Optical Amplifier Used as an In-Line Detector with the Signal DC-Component Conservation, Journal of Lightwave Technology, Jul. 1, 1998, pp. 1295-1301, vol. 16, No. 7, IEEE.

Connelly, M., "Semiconductor Optical Amplifiers", Jan. 31, 2002, pp. 1-169, Kluwer Academic Publishers.

Agrawal, G, "Fiber-optic Communication Systems", Chapter 11.1.3, 2010, pp. 522-526, 4th Edition, Wiley.

* cited by examiner

OTM FUNCTIONALITY IN SOA BASED TRANSCEIVERS

TECHNICAL FIELD

The invention relates generally to arrangements, methods and systems for monitoring the status of a Passive Optical Network, PON.

BACKGROUND

The access network is the last drop between a service provider and a subscriber. This drop, for connecting the subscriber and the service provider, is still today mainly copper dominated in most regions of the world. However, in the future demand for Fiber-To-The-Home, FTTH, is expected to increase based on increased bandwidth requirements. FTTH is feasible as point-to-point, P2P, or point-to-multipoint, P2MP, architectures. Physical P2MP topologies may be achieved using Passive Optical Networks, PONS. PONS may also be used for Fiber-To-The-x, FTTx, applications.

While PONS have many promising advantages, such as large reduction of the number of fibers from the network core, low power consumption, sharing of active equipment on the network side, reliability, upgradability and possible cohabitation of several operators on the same passive infrastructure, some problems and drawbacks, compared to other technologies, are still unsolved. One particular challenge for the network operator is to maintain and monitor the PON and to locate failures of equipment or fiber.

Figure 1:
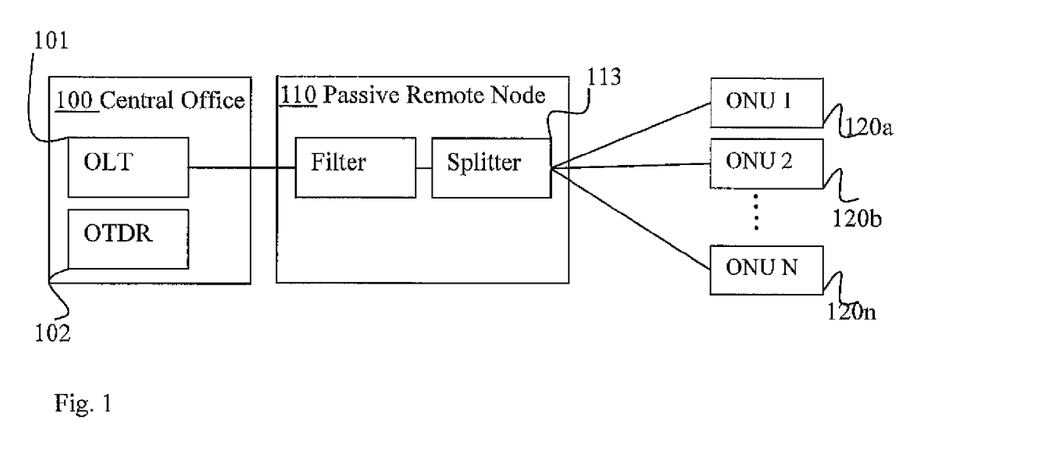
FIG. 1 is a block diagram illustrating a simple example of a PON, according to one example embodiment.

With reference to FIG. 1, a block diagram of one simple example of a PON, will now be described. The PON comprises a central office node 100. The Central office node 100 comprises an Optical Line Terminal, OLT, 101 and OTDR functionality for issuing Optical Time Domain Reflectrometry, OTDR, measurements. The OLT 101 normally also comprises monitoring functionality for maintaining the PON. One or more passive Remote Nodes, RN, 110 are connected to the OLT 101. The RNs are normally 110 having a filter and a splitter (not shown). The OLT 101 is connected to the splitter via the filter for routing optical signals from the RN 101 to the Optical Network Terminals, ONTs, also called Optical Network Units, ONUs, 120a-n.

Optical Layer Supervision, OLS, contains a set of capabilities relating to the measurement and reporting of the state of the optical link for Passive Optical Networks, PONS, such as Gigabit capable PONS, G-PONS, or 10G-PONS also known as XG-PONs. One necessary part of OLS is transceiver parameter monitoring which also is known as Optical Transceiver Monitoring, OTM. OTM may for example report the temperature, voltage, source bias current and/or received/transmitted power of a transceiver in the PON.

OTM measurements, such as received power of the transceiver, combined with OTDR, may enable the Central Office to detect if there is a faulty fiber link in the PON. Moreover, such combination may also enable increased capabilities to localize the fault.

Figure 2:
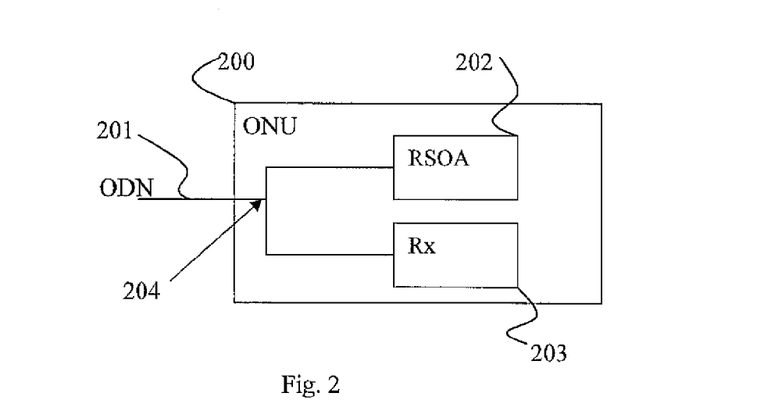
FIG. 2 is a block diagram of an ONU comprising a branch and a receiver, according to one example of the prior art.

One solution for measuring the received optical power at the ONT is to branch and measure a small amount of the received optical power. The branch and measurement is normally done within the ONU. With reference to FIG. 2, a block diagram illustrating an example configuration of an ONT comprising a branch solution for measuring the received optical power, according to the prior art will now be described. The ONT 200 is connected to the Optical Distribution Network, ODN, via a fibre 201. The fibre 201 is branched 204 in the ONU 200. In this example, a first portion of the received optical power is connected to a Reflective Semiconductor Optical Amplifier, RSOA, 202. The RSOA 202 is a gain medium which is reflective. The RSOA also erases the downstream signal and re-modulates the optical signal to carry the upstream data signal. In this description, the term ODN shall mean all equipment and optical fibre between the OLS and the ONT. I.e. the optical light signal is travelling from the OLT to the ONT through the ODN and back. Examples of equipment in the ODN are splitters, filters and switches.

In FIG. 2, a second portion is branched to a receiver 203, typically a semiconductor circuit capable of measuring the received optical power, e.g. a photodiode. Preferably, 10% of the downstream optical signal is branched, i.e. becomes the second portion, and measured in order to get a reliable result indicating the state of the drop link. Even if a very small amount is branched, such as 1%, the power loss over time will become significant. Consequently, this solution is associated with undesired Operational Expenses, OpEx, for the PON owner.

Hence, there is still a demand for simple, reliable, effective and low cost solutions for measuring and reporting the received optical power at the ONUs in a PON.

SUMMARY

It is an object of the invention to address at least some of the limitations, problems and issues outlined above. It is also an object to improve the process of performing monitoring of the state of the Optical Distribution Network, ODN, in a Passive Optical Networks, PON. It is possible to achieve these objects and others by using a method and an arrangement as defined in the attached independent claims.

According to a first aspect, a method in an Optical Network Terminal, ONT for monitoring the state of an Optical Distribution Network, ODN, in a Passive Optical Network, PON, is provided. The ONT receives an optical signal, from an Optical Line Terminal, OLT, having optical power, $P_{o,sat}$, causing a Semiconductor Optical Amplifier, SOA, comprised in the ONU, to reach a saturated state. One or more parameters are measured. The parameters relate to the power provided from a power source to the SOA during a predefined time period, where the SOA is in a saturated state during the predefined time period. Information relating to the measured parameters are provided to the OLT and thereby enabling the OLT to compare the current state of the ODN to a previously measured reference state of the ODN.

According to a second aspect, an Optical Network Terminal, ONT, arranged in a Passive Optical Network, PON, adapted to provide monitoring information, is provided. The ONT comprises a Semiconductor Optical Amplifier, SOA, which is adapted to receive an optical signal from an OLT. The received optical signal is having an optical power, $P_{o,sat}$, causing the SOA to reach a saturated state. The ONT further comprises a measuring unit which is adapted to measure one or more parameters relating to the power provided from a power source to the SOA during a predefined time period. The SOA is in a saturated state during the predefined time period when the measuring is performed. The ONT further comprises a providing unit which is adapted to provide information, relating to at least one of the measured parameters to an Optical Line Terminal, OLT. The OLT is thereby enabled to compare the current state of the ODN, based on the received information, to a previously measured reference state of the ODN.

The method and arrangement according to the aspects described above may have several advantages. By using a gain saturated SOA, Optical Transceiver Monitoring, OTM, functionality may be enabled without any modifications of the SOA. Thus, no extra hardware is needed and the data transmission is not affected. The solutions as described above provide an easy in-service monitoring of the ODN. The solution is easy to implement and easy to retrofit into already deployed ONTs.

The above method and arrangement may be configured and implemented according to different embodiments. In one example embodiment, the power provided from the power source is measured by determining the voltage and/or current over a load. The load is coupled to the power source and the SOA.

According to one possible embodiment, the ONT provides information relating to parameters indicating a fault in the ODN if the optical power of the received optical signal is below a predefined threshold value.

According to another possible embodiment, wherein the SOA receives an optical signal having optical power causing the SOA to reach a saturated state in a periodic manner or on-demand. The ONT is thereby caused to provide information relating the measured parameters to the OLT in a periodic manner or on-demand.

According to yet another possible embodiment, wherein $P_{o,sat}$ is the received optical power corresponding to a decrease of gain in the SOA. According to another possible example embodiment, the decrease of gain is more than 3 dB.

According to another possible embodiment, the information relating to the measured parameters are provided to the OLT as user data from the ONT.

BRIEF DESCRIPTION OF DRAWINGS

The invention will now be described in more detail by means of exemplary embodiments and with reference to the accompanying drawings, in which.

DETAILED DESCRIPTION

Briefly described, a procedure and arrangement in an ONT for monitoring the state of an ODN is provided. In this description, an ONT may be interchangeably replaced with Optical Network Unit, ONU. The solution utilizes characteristics relating to a Semiconductor Optical Amplifier, SOA, at the ONT. The SOA is normally used at the ONT to amplify, erase and re-modulate the optical signal before it is reflected, or looped, back towards the Optical Line Terminal, OLT, in the central office. In this description, downstream optical signals mean optical signals traveling from the OLT through the ODN to one or more ONTs. Upstream optical signals shall thus mean optical signals which are reflected or looped back from an ONT through the ODN towards the OLT.

Generally described, a current state of the ODN determined by measuring parameters associated with the electric characteristics of the power source which is coupled to the SOA. The current state may then be compared to a previously measured reference state. The reference state may be measured and recorded at a time when the PON operator knows the state of the complete PON. For example when deploying or maintaining the PON.

In order to describe the solution in detail, the function, usage and characteristics of a SOA is briefly described. SOAs have been proven to enable low cost manufacturing and at the same time tolerate high bit rate and satisfying distances. Thus, SOAs may be used as a transmitter in PON networks. SOAs are electrically pumped by injection of electrons into the active region and thus creating a population inversion. Holes and electrons recombine by means of stimulated emission. When the optical signal is launched into one of the orifices of the SOA, the signal is amplified by stimulated emission with a gain, as long as the gain remains unsaturated. However, the optical gain may easily become saturated which causes the SOA to become transparent. The gain saturation characteristic of the SOA may limit the usefulness as an optical amplifier. The inventors have, however, realized that the gain saturation of the SOA may be used in order to monitor the received optical power of the downstream signal.

Figure 3:
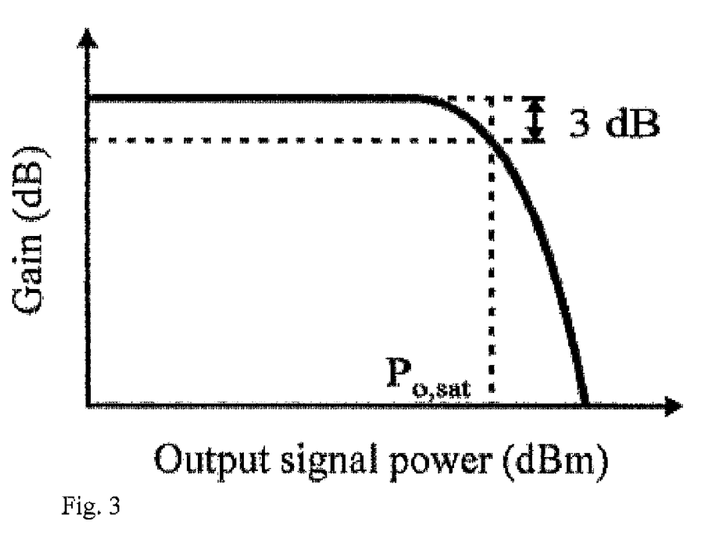
FIG. 3 is a diagram illustrating a relationship between gain and optical signal power for a SOA.

With reference to FIG. 3, a graph showing a relationship between the gain in dB in a SOA, on the Y-axis, and the output signal power in dBm from an OLT is described. The output signal power, from the OLT, may of course correspond to the received input optical power at the ONT. The output signal power may be determined and regulated at an OLT in the central office.

At a certain output/input signal power value, the SOA becomes saturated which is indicated by the step drop in gain in FIG. 3. According to one example, the SOA is in a saturated state when the gain value is 3 dB or less compared to a reference value, as indicated in FIG. 3. The reference value may be determined based on a linear regime, i.e. the value for which the gain is stable regardless of the signal power on the x-axis. The output signal power which saturates the SOA is hereafter referred to as $P_{o,sat}$.

Figure 4:
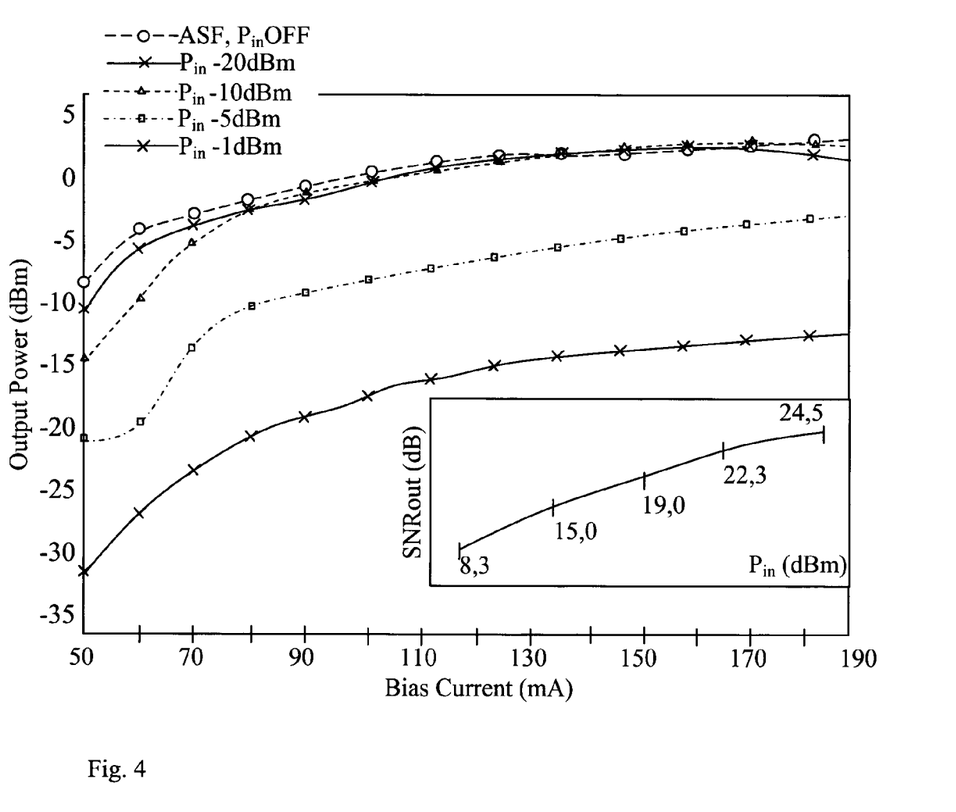
FIG. 4 is a diagram illustrating a relationship between output power and a bias current for a SOA.

The SOA will normally amplify the optical signal before the optical signal is reflected or looped back as upstream data signals. The SOA is connected to a Radio Frequency, RF, connector, such as for example a SubMinature version A, SMA connector. The RF connector is connected to the SOA and performs the gain and the re-modulation of the signal. The RF connector is in turn normally connected to a bias T connection to separate Alternating Current, AC, current, carrying user data for the upstream signal, and Direct Current, DC, current to control the gain in the SOA. According to one possible example, the RF connector also reads the downstream optical signals. With reference to FIG. 4, a graph showing the relationship between the output power and the bias current is described. FIG. 4 further shows the SOA characterisation in terms of output power, including signal and amplified spontaneous emission, ASE, as a function of bias current and input power. In FIG. 4, two clear regions can be distinguished. A first region having an increasing output power while increasing the bias current. This first region is also referred to as the linear regime. The graph in FIG. 4 also shows a second region having a flat output power while increasing the bias current. The second region is referred to as the saturation regime. Thus, the operation of the SOA can be divided into two parts, a linear regime and a saturation regime, based on the characteristics of the SOA.

With the characteristics of a SOA in an ONT in mind, a procedure for measuring and providing information relating to the received optical power, i.e. procedure for performing OLT at the ONT, will now be described below.

Figure 5:
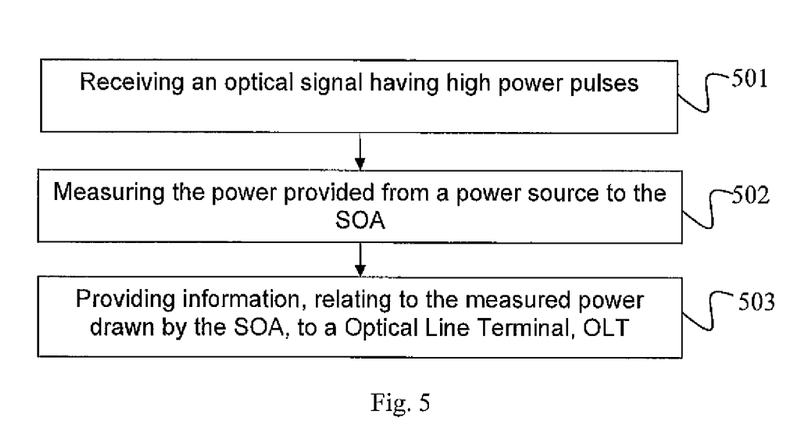
FIG. 5 is a flow chart illustrating a procedure for determining the state of an ONU in a PON by saturating a SOA, according to one example embodiment.

With reference to FIG. 5, a procedure in an ONT for monitoring the state of an ODN in a PON is described. In a first action 501, an optical signal having optical power, $P_{o,sat}$, is received from an OLT. The received optical power is having an optical power high enough in order to cause a SOA which is comprised in the ONT, to reach a saturated state.

Once the SOA has reached a saturated state, one or more parameters are measured in action 502. The one or more parameters are relating to the power provided from a power source to the SOA. The power source is normally used in order to provide gain, erasing of downstream signal and re-modulation of the signal before the upstream signal is reflected or looped to travel back though the PON towards the OLT in the central office. The parameters are measured during a predefined time period for which the SOA is in a saturated state. In action 503, information relating to at least one of the measured parameters is provided to the OLT. Thereby, the OLT is enabled to compare the measured parameters, which are indicating the current state of the ODN, to a previously measured reference parameters indicating a reference state of the ODN.

In other words, when the SOA becomes saturated and is working in the saturation regime, the SOA acts as a photodetector by sensing the voltage variation of the electrode in the SOA. However, when not saturated, it may act as a transmitter by modulating the incoming optical signal with the SOA injection current that carries the upstream user data. The reading of downstream data signals and transmission of upstream data signals may also be performed by other entities within the ONT.

The OLT provides the optical signals to the ONTs using the ODN. By comparing parameters relating to the power consumption of the SOA when it reaches a gain saturated state to a previously measured reference value, the OLT may calculate a difference $\Delta V$. According to one possible example, $\Delta V$ may be used to determine the state of the ODN in-between the OLT and the ONT. If $\Delta V$ is above a first threshold or below a second threshold, then the OLT may further investigate the reason for the anomaly of received power at the ONT. According to one embodiment, the OLT triggers an OTDR measurement if $\Delta V$ is above a first threshold or below a second threshold. The threshold values may be predefined and furthermore determined by the operator of the PON, based on the tolerance margin relating to the acceptable power fluctuations. According to one possible example, the tolerance margin may be set to 1 dB.

By introducing the above described solution, using a gain saturated SOA, enables the OTM functionality without any modifications of the SOA. No extra hardware is needed and the data transmission is not affected. It provides an easy in-service monitoring of the ODN. The solution is easy to implement and retrofit into already deployed ONTs.

According to one possible embodiment, the one or more measured parameters relates to the power provided from a power source to the SOA via the RF connector. In such embodiment, the parameters may relate to the voltage or the current over a load connected to the distribution of electrical power from the power source to the SOA via the RF connector. Also other parameters which are related to the voltage or current may be used in order to determine the behavior of the SOA and RF connector when it becomes gain saturated. The parameters may be aggregated or reformatted to efficient handling and comparison at the OLT. The aggregation or reformatting may be done either at the ONT or at the OLT. According to one example, the parameters are reformatted to fit into a predefined reporting structure and packaged into the user data in order to enable efficient comparison at the OLT.

If the ONT is constantly receiving low, or no, power of the optical signal, it may provide parameter value to the OLT indicating a faulty state of the ODN and/or the ONT.

Figure 6:
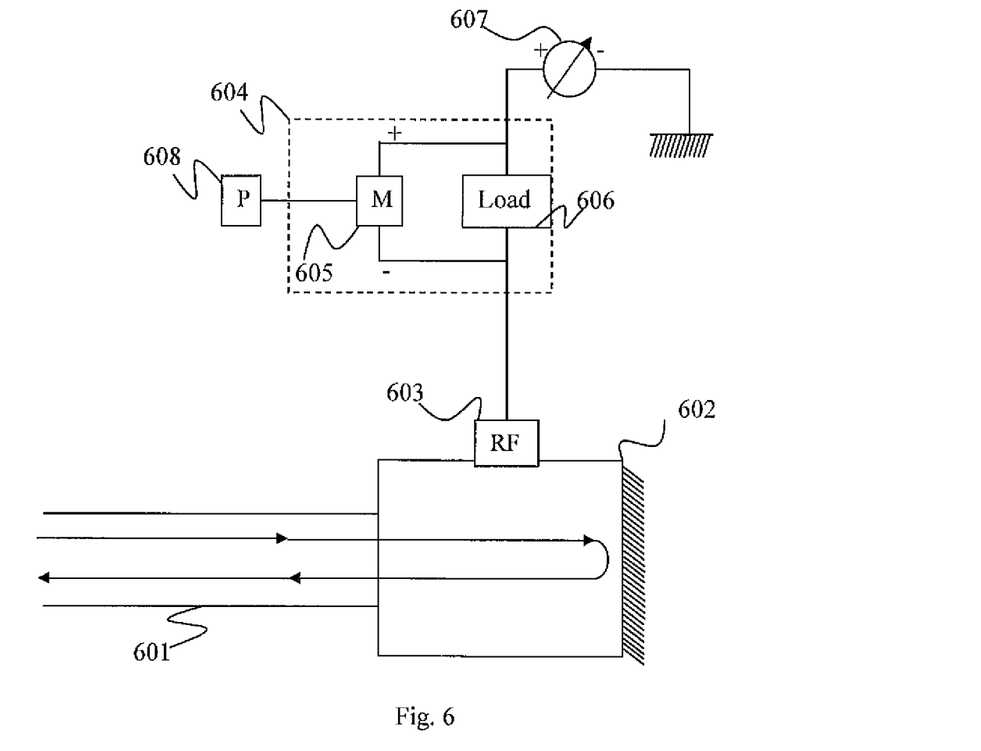
FIG. 6 is a block diagram illustrating an arrangement in an ONU for measuring the state of the ONU using a SOA, according to one example embodiment.

With reference to FIG. 6, an arrangement in an ONT adapted to provide monitoring information, is described. The arrangement in described with reference to FIG. 6 may perform the actions as described with reference to FIG. 5 above.

A fiber 601 is connected to a SOA 602. In this example, the SOA 602 is adapted to receive and optical signal from an OLT. The received optical signal is then amplified, erased and re-modulated before it is reflected back to travel through the ODN towards the OLT. The received optical signal has an optical power. If the power of the optical signal is high enough, the SOA is adapted to become saturated, i.e. an optical signal having an optical power $P_{o,sat}$ will cause the SOA to reach a saturated state.

A RF connector 603 is connected to the SOA 602. The RF connector 603 is adapted to perform the gain and the re-modulation of the received optical signal. Hence, the RF connector 603 is also connected to a power source 607 in order to gain the optical signal. In between the power source 607 and the RF connector 603, the ONT further comprises a measuring unit 604. The measuring unit 604 is adapted to measure one or more parameters relating to the power provided from a power source 607 to the SOA 602, via the RF connector 603, during a predefined time period. The SOA 602 is in a saturated state during the predefined time period.

According to one possible embodiment, the measuring unit 604 comprises a load 606 and a parameter measuring unit 605. The parameter measuring unit 605 may be measurement circuit such as a voltmeter, an ammeter, a multimeter or another similar measurement circuit. The parameter measuring unit 605 determines parameters relating to the power consumed by the SOA during the predefined time period for which the SOA 602 is in a saturated state. In certain embodiments, electrical pre-amplification may be needed in order to detect the measured signals over the load 805.

The information relating to the parameters is provided from the measuring unit 604 to a providing unit 608. The providing unit 608 is adapted to provide the parameters, information relating to the parameters or an aggregate of the measured parameters to the OLT. This may be done by feeding the information back to the OLT using the data feed which transformed into the upstream optical signal using the RF connector 603 and the SOA 602. Thereby the ONT enables the OLT to compare the current state of the ODN, based on the provided information, to a previously measured reference state of the ODN.

By introducing the measurement unit as described above using a gain saturated SOA for measurement, OTM functionality without any modifications of the SOA is enabled. No extra hardware is needed and the data transmission is not affected. It provides an easy in-service monitoring of the ODN. The solution is easy to implement and retrofit into already deployed ONTs.

According to one embodiment, the providing unit may be further adapted to provide information relating to parameters indicating a fault at the ONT or in the ODN, if the optical power of the received optical signal is below a predefined threshold value. This may be performed regardless whether the SOA is in a saturated state or not.

According to one possible embodiment, the SOA may be adapted to reach a saturated state when $P_{o,sat}$ corresponds to a decrease of gain in the SOA as described above with reference to FIG. 3. According to another possible embodiment, the SOA is adapted to reach the saturated state, for which the measurement may commence, when the decrease of gain is more than 3 dB.

Figure 7:
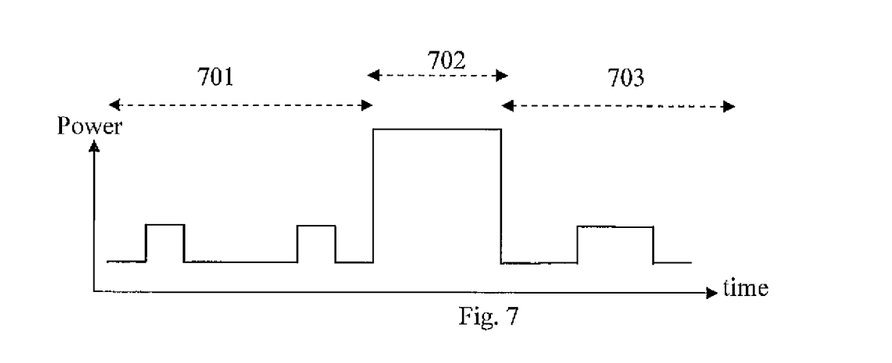
FIG. 7 is a pulse diagram illustrating segments of data transfer and a high power train of pulses to saturate the SOA, according to one example embodiment.

With reference to FIG. 7, a pulse diagram illustrating one example of a train of high power pulses saturating the SOA is now described. The pulse diagram in FIG. 7 shows a mere example of the power intensity of an optical signal which is launched into the ODN from the OLT towards one or more ONTs. In a first region 701, a stream of data is received, i.e. a stream of ones and zeroes is received. Then in a second region 702 comprising several pulses of high power are launched in order to saturate the SOA. By launching the train of high power pulses, the OLT can trigger an OTM measurement at the ONT. After the second region 702 of high power pulses, normal data transmission may be performed again in a third region 703.

According to one possible embodiment, the SOA may be adapted to receive optical signals, comprising high power pulses, in a periodic manner or on-demand based by the OLT. In other words, the OLT may transmit high power pulses to one or more ONTs in a periodic manner in order to trigger the ONTs to measure parameters relating to the received optical power. Thereby, the OLT may periodically compare the current state of the ODN to a reference state, so that any fault may be determined. The OLT may also launch the high power pulses on-demand to one or more ONTs and thereby receive information relating to the state of the ODN on-demand.

Figure 8:
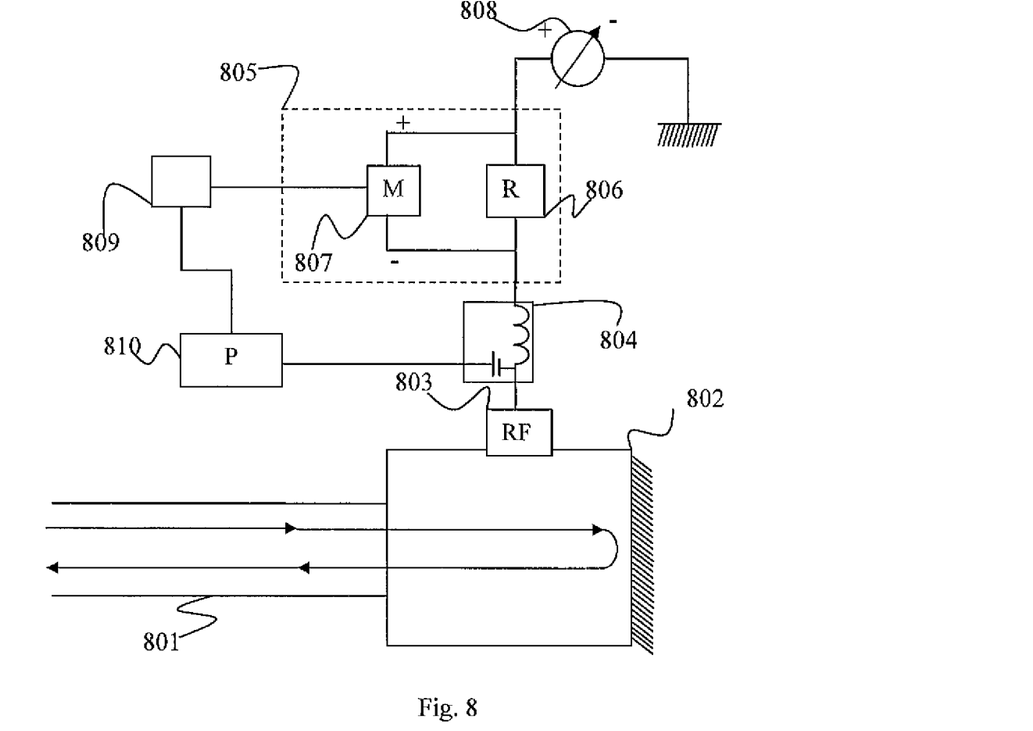
FIG. 8 is a block diagram illustrating an arrangement in an ONU for measuring and calculating the state of the ONU using a SOA and logic, according to one possible example embodiment.

With reference to FIG. 8, a block diagram illustrating one possible embodiment of the arrangement in an ONT is described. Similar to FIG. 6, a fiber 801 is connected to a SOA 802 which is electronically pumped by the RF connector 803. The optical signal is received, amplified and re-modulated by the RF connector 803 and thereafter reflected back into the fiber 801. In this example embodiment, the RF connector 803 is connected to a bias T block 804. The bias T block 804 is adapted to separate the AC current carrying user data to transmit and DC current used to control the gain in the SOA 802. A power source 808, providing DC current to the RF connector 803, is serially connected to a load 806. According to one possible example embodiment, a resistor may be used as a load 806. A parameter measuring unit 807 is connected to the resistor 806. The parameter measuring unit 807 is adapted to measure the characteristics in the circuit when the SOA 802 reaches a saturated state. According to one possible example, the voltage may be determined when the SOA 802 reaches a saturated state.

Information relating to the measured parameters in the parameter measuring unit 807 is provided to data logic 809 adapted format and prepare the measured parameters for transmission to the OLT. The data logic 809 is connected to a providing unit 810. The providing unit 810 is connected to the bias T block 804 which is adapted to receive user data for the upstream optical signal. In other words, the providing unit 804 is adapted to feed the information relating to the measured parameters into the data stream to be transmitted with the upstream optical signals to the OLT.

Figure 9:
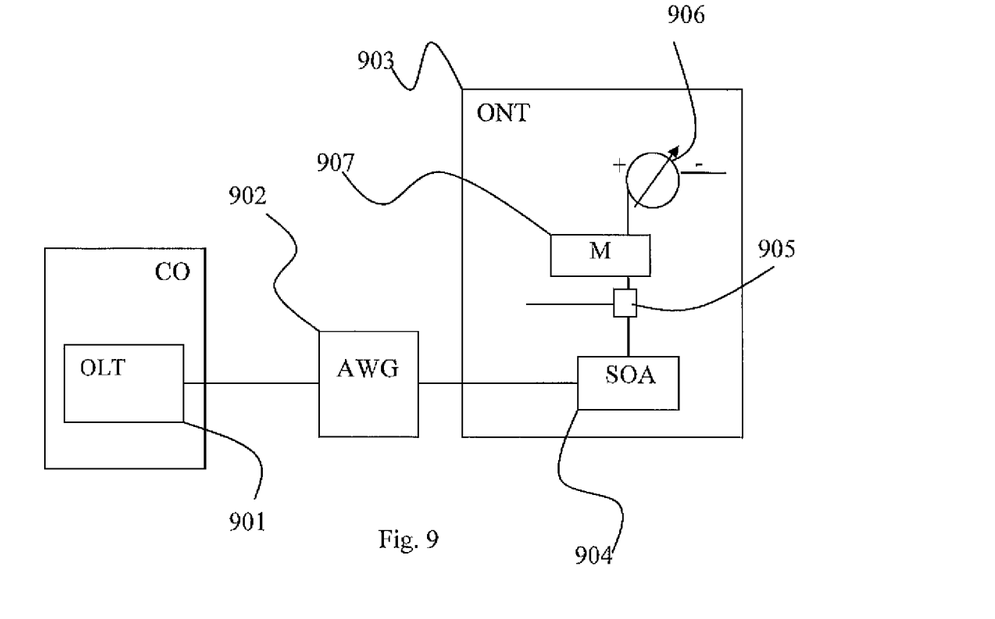
FIG. 9 is a block diagram illustrating a simple schematic view of a PON having an ONU comprising a SOA for fault detection, according to one possible embodiment.

With reference to FIG. 9, a block diagram illustrating a schematic overview of a PON is described. The Central Office, CO, comprises an OLT 901 which is an end point at the service provider of the PON. The CO is connected via fiber to a RN comprising an Arrayed Waveguide Grating, AWG, filter. The RN is routing the optical signals to one or more ONTs 903. However, for simplicity reasons, only one ONT 903 is shown in FIG. 9. The ONT 903 comprises a SOA 904 adapted to receive, gain, re-modulate and reflect the optical signal back towards the OLT 901, carrying user data from the ONT. A series of actions will now be described with reference to FIG. 9. The OLT 901 launches a series of high power optical signals into the ODN and through the RN 902. The high power signal travels to the ONT 903 wherein a SOA 904 of the ONT 903 becomes gain saturated, i.e. it reaches a saturated state. A measuring unit 907 initiates measurement of parameters relating to the power provided from a power source 906 to the SOA 904, by measuring the electric characteristics of a load (not shown) comprised in the measuring unit 907. The information of the measured parameters is then provided back, using the SOA 904, through the ODN using the upstream optical signal. This may be achieved by using the user data provided to the SOA 904 though a bias T 905. Thereby letting the OLT 901 access information relating to parameters associated with the electronic characteristics of the SOA, indicating the current state of the ONT 903 and ODN in which the received optical signal has traveled. The OLT 901 may then compare the current state of the ODN based on the measured parameters at the ONT 903 to a reference state. It should be noted that FIG. 9 only shows a simple example configuration of a PON. The solution of saturating SOAs at the ONT to trigger OLS may also be used in more complex PON architectures with more complex splitters, filter at the RN.

Figure 10A:
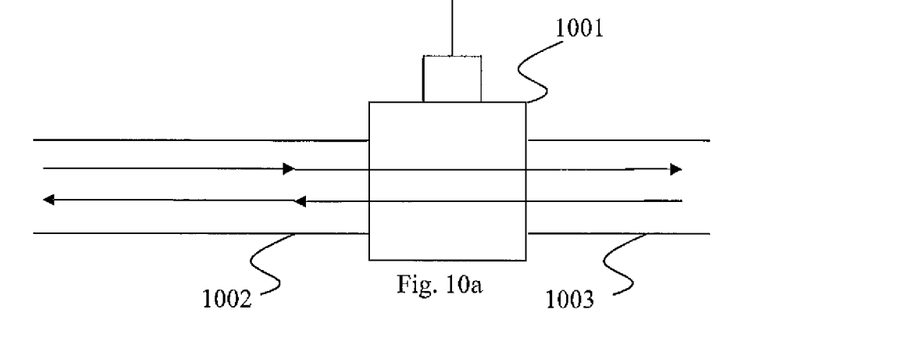
FIG. 10a is a block diagram illustrating a schematic view of a SOA which is not reflecting optical signals, according to one possible embodiment.
Figure 10B:
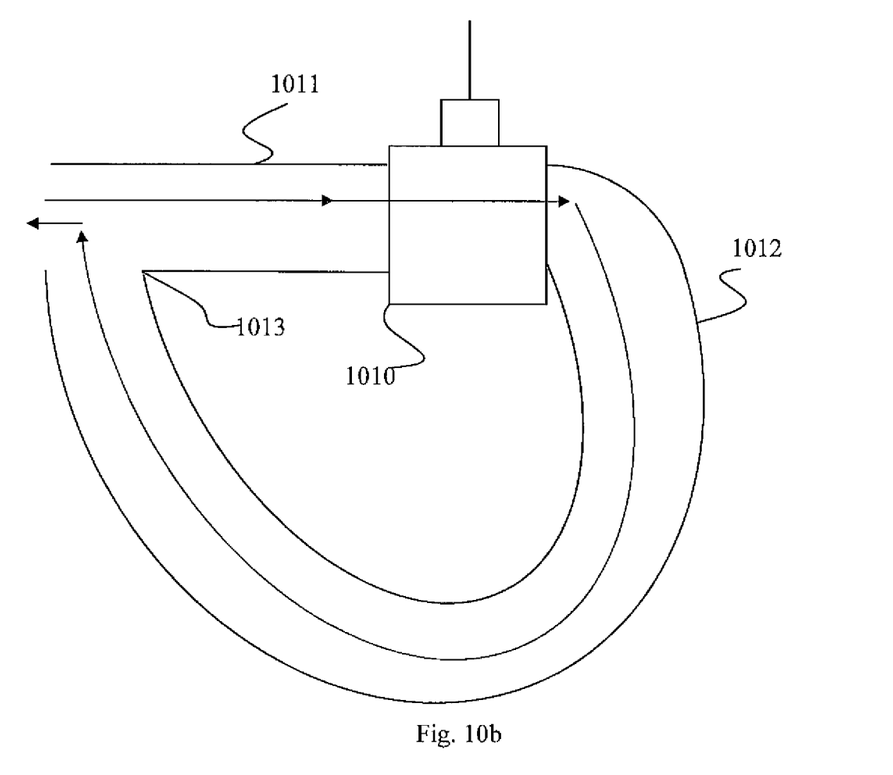
FIG. 10b is a block diagram illustrating a schematic view of a SOA, which is not reflecting optical signals, and a loop for returning the optical signal, according to one possible embodiment.

With reference to FIG. 10*a* and FIG. 10*b*, another possible embodiment of a SOA at an ONT is described. Instead of reflecting the received optical signal, FIG. 10*a* and FIG. 10*b* illustrates SOAs which only amplifies and re-modulates the optical signal. The configuration in FIG. 10*a* comprises a first fiber 1002 and a second fiber 1003. The first fiber 1002 and the second fiber 1003 are connected to a SOA 1001 so that the optical signal can travel through, e.g. from the first fiber 1002 via the SOA 1001 and then into the second fiber 1003.

If the SOA configuration as illustrated in FIGS. 10*a*-*b* receives a high power optical signal and reaches a saturated state, measurements as described above with reference to FIGS. 5-9 may be performed. In FIG. 10*b*, a first fiber 1011 is connected to a SOA 1010. The first fiber carries the upstream and downstream optical signals from the OLT via a RN to the SOA arranged in the ONT. The received optical signal is re-modulated and amplified and thereafter looped back into the first fiber 1101 using a second fiber 1012. The second fiber 1012 is joined 1013 so that the signal may loop back into the first fiber and become upstream signals.

In the description above with reference to FIG. 6 and FIGS. 8-10*b*, it should be understood that functional relationships shall supersede spatial relationships.

By using the procedures and arrangement described above, a low cost yet efficient monitoring of the status of the PON may be achieved. While the invention has been described with reference to specific exemplary embodiments, the description is generally only intended to illustrate the inventive concept and should not be taken as limiting the scope of the invention. The invention is defined by the appended claims.

ABBREVIATIONS

AC—alternate current
ASE—amplified spontaneous emission
AWG—arrayed waveguide grating
CO—central office
DC—direct current
FTTH—Fiber To The Home
FTTx—Fiber To The x
ODN—Optical Distribution Network
OLS—optical layer supervision
OLT—Optical Line Terminal
ONT—Optical Network Terminal
ONU—Optical Network Unit
OTDR—Optical Time Domain Reflectometry
OTM—Optical Transceiver Monitoring
PON—passive optical network
P2MP—Point to Multipoint
P2P—Point To Point
PON—Passive Optical Network
RF—radio frequency
RN—remote node
RSOA—Reflective Semiconductor Optical Amplifier
SMA—Subminiature A
SOA—Semiconductor Optical Amplifier

The invention claimed is:

1. A method, in an Optical Network Terminal (ONT), for monitoring the state of an Optical Distribution Network (ODN) in a Passive Optical Network (PON), the method comprising:
   receiving an optical signal from an Optical Line Terminal (OLT), the optical signal having an optical power (Posat) that causes a Semiconductor Optical Amplifier (SOA) of the ONT to reach a saturated state;
   measuring one or more parameters relating to a power provided from a power source to the SOA during a predefined time period, wherein the SOA is in the saturated state during the predefined time period;
   providing, to the OLT, information relating to at least one of the measured parameters, thereby enabling the OLT to compare a current state of the ODN to a previously measured reference state of the ODN.

2. The method of claim 1, wherein the measuring one or more parameters relating to the power comprises determining a voltage and/or a current over a load, wherein the load is coupled to the power source and the SOA.

3. The method of claim 1, further comprising the ONT providing information relating to parameters indicating a fault in the ODN in response to the optical power of the received optical signal being:
   above a first predefined threshold value; or
   below a second predefined threshold value.

4. The method of claim 1, wherein the SOA receives an optical signal having optical power causing the SOA to reach a saturated state in a periodic manner, thereby causing the ONT to provide information relating the measured parameters to the OLT in a periodic manner.

5. The method of claim 1, wherein the SOA receives an optical signal having optical power causing the SOA to reach a saturated state in an on-demand manner, thereby causing the ONT to provide information relating the measured parameters to the OLT in an on-demand manner.

6. The method of claim 1, wherein Posat is received optical power corresponding to a decrease of gain in the SOA.

7. The method of claim 6, wherein the decrease of gain is more than 3 dB.

8. The method of claim 1, wherein the providing information comprises providing information relating to the measured parameters as user data from the ONT.

9. An Optical Network Terminal (ONT) arranged in a Passive Optical Network (PON) and configured to provide monitoring information regarding the state of an Optical Distribution Network (ODN) in the PON, the ONT comprising:
   a Semiconductor Optical Amplifier (SOA) configured to receive an optical signal from an Optical Line Terminal (OLT), the signal having an optical power (Posat) that causes the SOA to reach a saturated state;
   a measuring circuit configured to measure one or more parameters relating to a power provided from a power source to the SOA during a predefined time period, wherein the SOA is in a saturated state during the predefined time period;
   a providing circuit configured to provide, to the OLT, information relating to at least one of the measured parameters, thereby enabling the OLT to compare a current state of the ODN to a previously measured reference state of the ODN.

10. The Optical Network Terminal of claim 9, wherein the measuring circuit is configured to measure the power provided from the power source by determining a voltage and/or a current over a load, wherein the load is coupled to the power source and the SOA.

11. The Optical Network Terminal of claim 9, wherein the providing circuit is configured to provide information relating to parameters indicating a fault at the ONT if the optical power of the received optical signal is either:
   above a first predefined threshold value; or
   below a second predefined threshold value.

12. The Optical Network Terminal of claim 9, wherein the SOA is configured to receive an optical signal having optical power causing the SOA to reach a saturated state in a periodic manner, thereby causing the ONT to provide information relating the measured parameters to the OLT in a periodic manner.

13. The Optical Network Terminal of claim 9, wherein the SOA is configured to receive an optical signal having optical power causing the SOA to reach a saturated state in an on-demand manner, thereby causing the ONT to provide information relating the measured parameters to the OLT in an on-demand manner.

14. The Optical Network Terminal of claim 9, wherein Posat is received optical power corresponding to a decrease of gain in the SOA.

15. The Optical Network Terminal of claim 14, wherein the SOA is configured to reach a saturated state when the decrease of gain is more than 3 dB.

16. The Optical Network Terminal of claim 9, wherein the providing circuit is configured to provide the measured parameters to the OLT as user data.

* * * * *

UNITED STATES PATENT AND TRADEMARK OFFICE
CERTIFICATE OF CORRECTION

PATENT NO.        : 9,088,838 B2
APPLICATION NO.   : 14/131455
DATED             : July 21, 2015
INVENTOR(S)       : Vall-Llosera et al.

It is certified that error appears in the above-identified patent and that said Letters Patent is hereby corrected as shown below:

On the title page

Item 12, under "United States Patent", in Column 1, Line 2, delete "Vall-Ilosera" and insert -- Vall-Llosera --, therefor.

Item 75, under "Inventors", in Column 1, Line 1, delete "Gemma Vall-Ilosera," and insert -- Gemma Vall-Llosera, --, therefor.

In the specification

In Column 1, Line 20, delete "PONS. PONS" and insert -- PONs. PONs --, therefor.

In Column 1, Line 22, delete "PONS" and insert -- PONs --, therefor.

In Column 1, Lines 41-42, delete "RN 101" and insert -- RN 110 --, therefor.

In Column 1, Line 46, delete "Networks, PONS," and insert -- Networks, PONs, --, therefor.

In Column 1, Line 47, delete "PONS, G-PONS, or 10G-PONS" and insert -- PONs, G-PONs, or 10G-PONs--, therefor.

In Column 7, Line 56, delete "load 806." and insert -- load 805. --, therefor.

In Column 7, Line 58, delete "load 806." and insert -- load 805. --, therefor.

In Column 8, Lines 3-4, delete "providing unit 804" and insert -- providing unit 810 --, therefor.

Signed and Sealed this
Twelfth Day of January, 2016

Michelle K. Lee
*Director of the United States Patent and Trademark Office*